Aug. 15, 1944. R. T. ZWACK 2,356,115
POWER PLANT SYNCHRONIZATION
Filed Aug. 17, 1942 3 Sheets-Sheet 3

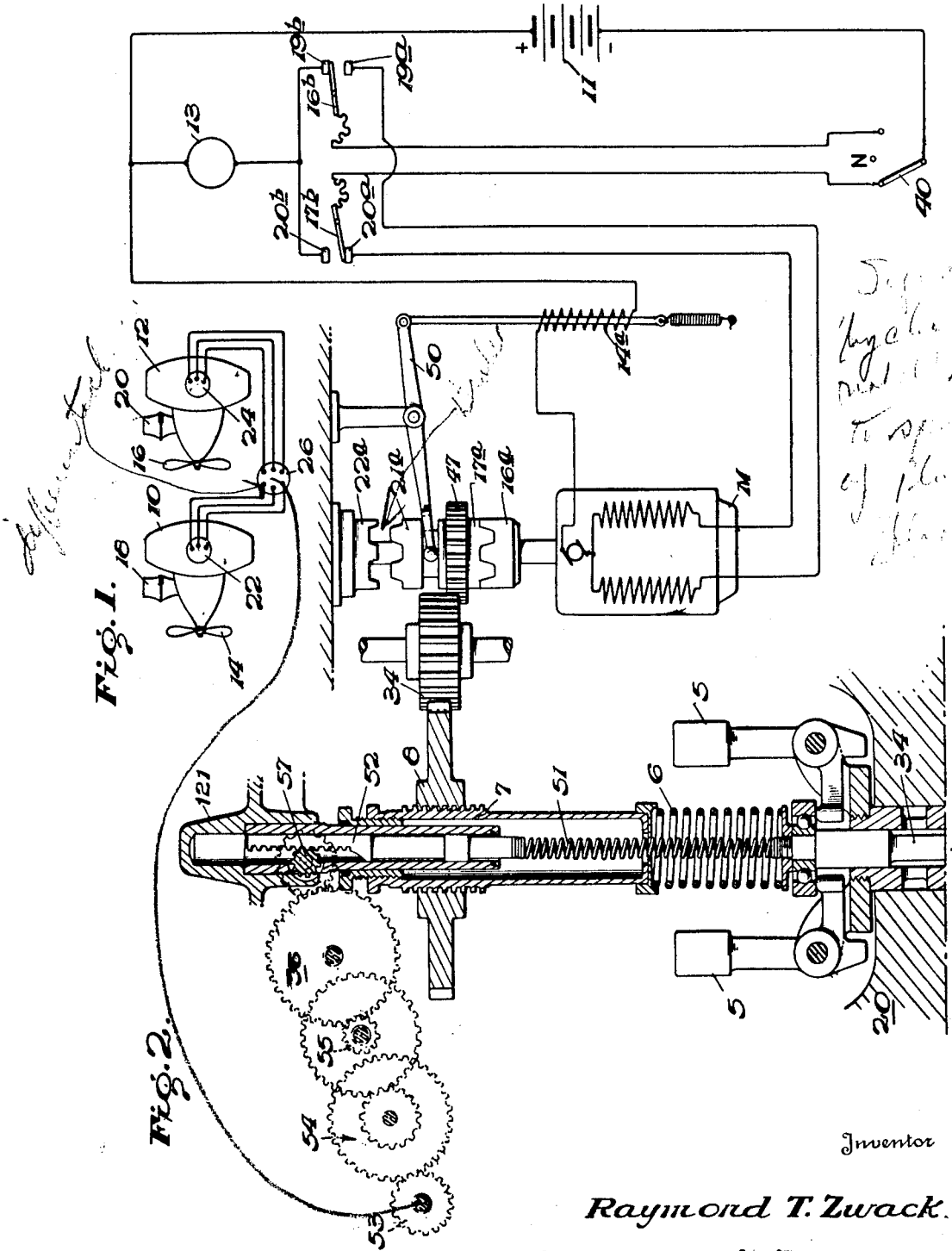
Aug. 15, 1944.   R. T. ZWACK   2,356,115
POWER PLANT SYNCHRONIZATION
Filed Aug. 17, 1942   3 Sheets-Sheet 1
Inventor
Raymond T. Zwack.
By Martin J. Finnegan
Attorney

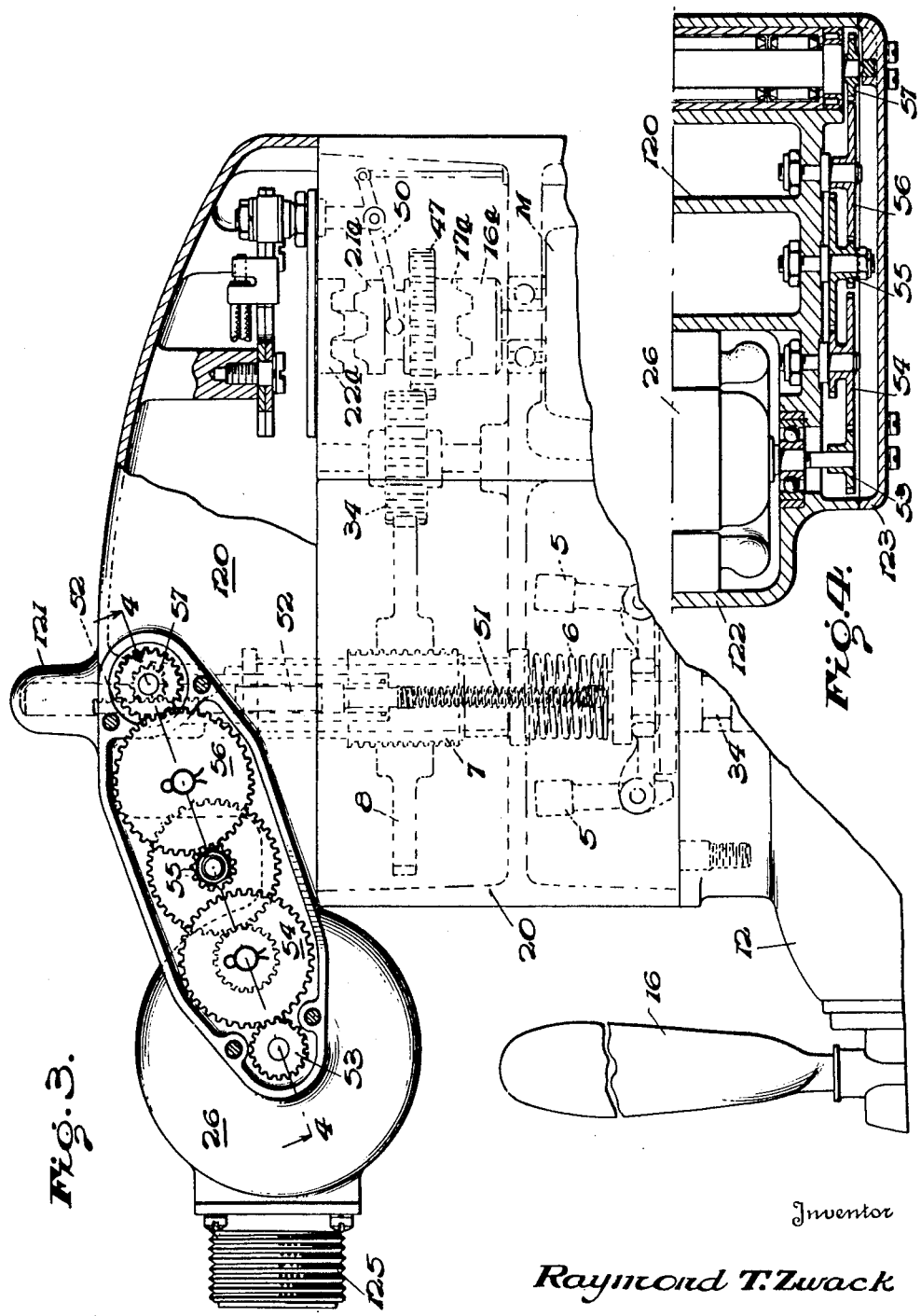

Inventor
Raymond T. Zwack
By Martin J. Finnegan
Attorney

Patented Aug. 15, 1944

2,356,115

UNITED STATES PATENT OFFICE 2,356,115

POWER PLANT SYNCHRONIZATION

Raymond T. Zwack, West Caldwell, N. J., assignor to Bendix Aviation Corporation, South Bend, Ind., a corporation of Delaware Application August 17, 1942, Serial No. 455,155

1 Claim. (Cl. 60—97)

This invention relates to improvements in synchronizing means for power plants and has for an object the production of a simplified and highly efficient synchronizing arrangement for two or more power plants.

A further object of the invention resides in the provision of an electrically actuated device for synchronizing the speed of two or more power plants.

A further object resides in the provision of electrically actuated means for synchronizing the speeds of one or more power plants with the speed of a reference speed device.

A still further object resides in the provision of means for synchronizing two or more speed governed power plants.

Other objects and advantages will be more particularly pointed out hereinafter or will become apparent as the description proceeds.

In the accompanying drawings in which like reference numerals are used to designate similar parts throughout, there is illustrated a suitable arrangement of the improved synchronizing device. The drawings, however, are for the purpose of illustration only and are not to be taken as limiting the invention as set forth in the appended claim.

In the drawings,

Fig. 1 is a schematic illustration of one arrangement of the improved synchronizing apparatus arranged to maintain the speed of a plurality of power plants, such as propeller driving aircraft engines, in synchronism;

Fig. 2 is a schematic illustration of that portion of the synchronizing apparatus which is associated with one of the two power plants indicated in Fig. 1;

Fig. 3 is a view in elevation, with parts of the housing removed, of the apparatus of Fig. 2;

Fig. 4 is a view taken along line 4—4 of Fig. 3;

Figure 6:
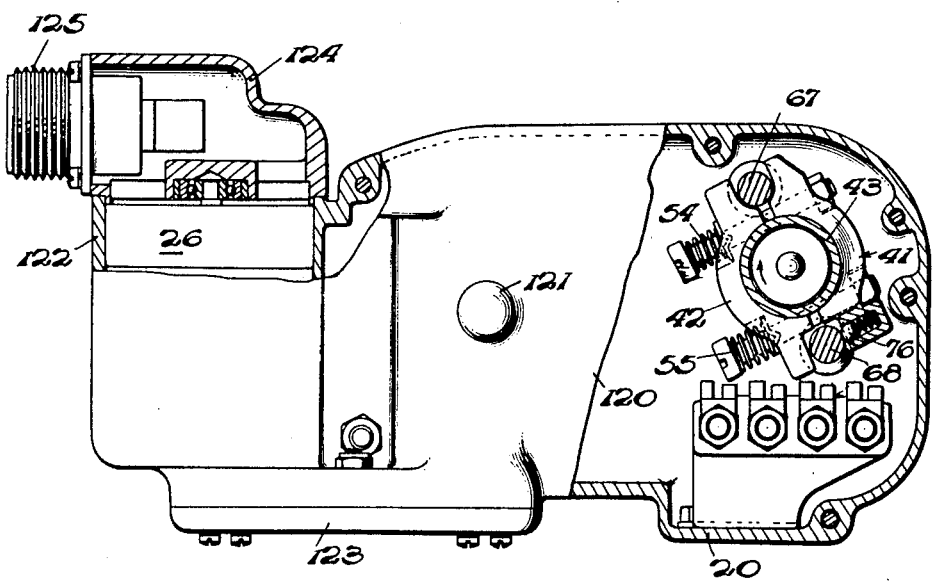
Fig. 6 is a top plan view, with parts of the housing removed.

Referring to the drawings in detail, and particularly to Fig. 1, the numeral 10 generally indicates one of a plurality of power plants and the numeral 12 another and similar power plant. In the illustration the two power plants 10 and 12 have been shown as internal combustion engines adapted to be mounted upon an aircraft and providing the propulsive power therefor.

In the application of the invention herein illustrated each of the engines 10 and 12 is provided with some efficient form of speed regulating apparatus effective to maintain the speed of the corresponding engine substantially constant at some selected or predetermined value. For example each of the engines 10 and 12 may be provided with a controllable pitch propeller, as indicated at 14 and 16, respectively, and which may be of the form particularly illustrated in Patent No. 2,032,255, issued February 25, 1936, to F. W. Caldwell. Each of the propellers may be controlled in its pitch changing action by a suitable engine-driven governor such as is particularly illustrated and described in British Patent No. 470,284, issued November 4, 1937, to E. E. Woodward, and which are indicated at 18 and 20, respectively. As such engine, propeller and governor combinations are already well-known to the art, it is thought that a detailed description of the same is unnecessary for the purpose of this disclosure.

Figure 5:
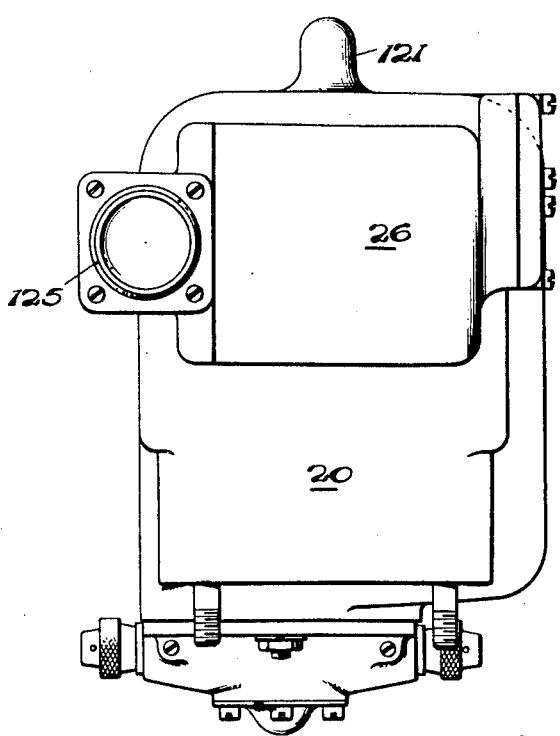
Fig. 5 is a view in elevation, at a right angle to the viewpoint in Fig. 3.

For speed synchronizing purposes each of the engines 10 and 12 drives a three-phase alternating current generator as indicated at 22 and 24, respectively. These generators are electrically connected to a suitable form of electrical differential mechanism. This differential unit is indicated at 26 in Fig. 1, and by the same reference numeral in Figs. 3, 4, 5 and 6.

Such an electrical differential mechanism may conveniently comprise an electric motor having separately energized relatively rotatable parts so wound that when alternating current from separate sources is applied in phase to the two relatively rotatable parts, there is no tendency for the parts to rotate relatively to each other; but when the current from one source applied to one of the relatively rotatable parts is out of phase with the alternating current from a different source applied to the other of the relatively rotatable parts, one of the parts will rotate in a particular direction with respect to the other, depending upon whether the out of phase condition of the one current is in the nature of a lead or a lag with respect to the other. By way of illustration, the differential motor 26 may have its stator portion connected to the alternator 22 driven by the engine 10 and its rotor portion connected to the alternator 24 driven by the engine 12; this being the arrangement suggested in Patent No. 2,258,462, granted to Erle Martin on October 7, 1941. With this arrangement the engine 10 may conveniently serve as the master engine while the engine 12 will be the controlled engine, the speed of which is to be synchronized with the speed of the master engine 10. As will be readily understood, additional controlled engines may be synchronized with the master engine by a simple duplication of certain portions of the improved synchronizing apparatus and, if desired, all of the engines may be synchronized to the speed of some suitable reference speed device such as a controllable speed electric motor.

The governor 18 of the master motor 10 is desirably arranged for some form of automatic or manual adjustment in a manner well-known to the art, so that the speed of the master motor may be controlled within desired limits to establish a reference speed. The pitch of the propeller 16 is controlled by a valve 34, as in the Martin patent above identified, but I provide a novel operating assembly therefor, as will now be described.

Referring to Fig. 2, the reference characters M, 5, 6, 7, 8, 11, 13, 14a, 16a, 17a, 19a, 19b, 20a, 20b, 21a, 22a, 34 and 50 correspond to those similarly designated in my Patent No. 2,180,287, granted November 14, 1939; but in addition thereto I now provide a novel feature in the form of a separately compressible spring 51 of smaller diameter than the spring 6 and coaxial therewith. Spring 51, like spring 6, is effective to vary the setting of valve 34, but it is from fifty to one hundred times more sensitive than spring 6 and produces a micrometric increment to the force exerted by said spring 6; and whereas spring 6 is actuated by motor M, clutch 16a, 17a and gears 47 and 34, (as in my prior patent) spring 51 is actuated by the synchronizing apparatus 22—24—26 of Fig. 1; the differential motor 26 being mechanically geared to the spring actuating rack-toothed plunger 52, as indicated at 53, 54, 55, 56 and 57 in Figs. 2, 3 and 4.

If the alternating current supplied by the generators 22 and 24 acquires a respective out of phase condition due to a difference in speed of the motors 10 and 12, the rotor of the differential motor 26 will rotate in one direction or the other depending upon whether the speed of the engine 12 is above or below that of the engine 10. This rotation of the rotor of the motor 26, acting through the gear train 53 to 57, imparts movement to the plunger 52 to cause more or less deflection of the spring 51, thus changing its stress in the proper direction to apply a corrective force to the valve 34 and bring the controlled engine 12 back into a condition of speed synchronization with the master engine 10.

As in my former Patent No. 2,180,287, above referred to, the loading of the main spring 6 can be varied to cause the propeller blades 16 to assume either the high pitch or the low pitch position, according to whether switch 40 is thrown to the left or to the right of the position "N" (neutral). When throw to the left, for example, the switch 40 closes the electrical circuit of the winding of one field of the reversible D. C. motor M, and the solenoid 14a, holding the brake teeth on the movable tooth-clutch elements 21a away from associated teeth 22a of the brake. With suitable variable resistance (not shown) inserted in the circuit (as, for example, across the motor armature) the number of seconds required for the spring loader to move all the way from the high to the low pitch position may be regulated as desired. When this pitch limit is reached, contacts 16b, 19b (or 17b, 20b, as the case may be) operate to illuminate indicator 13, thereby signaling the operator to return switch 40 to position "N" (neutral). This swinging of the switch element from its normal position not only energizes indicator 13; it simultaneously breaks the motor circuit at the terminal point 19a (or 20a, as the case may be) thereby allowing the motor and solenoid to de-energize. This instantly causes the movable brake teeth 21a to engage with the stationary brake teeth 22a, thus bringing the gear train and loader 7 to a sudden stop. It is to be understood that springs or equivalent will be provided, (as indicated in my prior Patent 2,180,287) to constantly urge the contact arms into engagement with contact terminals 19a and 20a, respectively, and that each of these arms is thereby caused to return to said normal position as soon as the screw-carried switch actuator (shown at 18 in my prior Patent 2,180,287) moves out of engagement therewith. It follows, from the foregoing, that not more than one of said switch arms can be in the open-circuit position, with respect to motor M, at any given time.

To adjust for extreme high pitch position, the operation is the same as above, but in the reverse direction. The spring loading may be stopped at any intermediate position between the limiting ones described above by simply returning the switch 40 to position "N" at the desired intermediate pitch. This allows the clutch-brake to act and stop the loader 7 within approximately .0002 inch from the point occupied when the switch was released. From that point of approximate synchronization with the master engine 10, the circuit 22—24—26 will operate upon micro-spring 51 to produce exact synchronization.

As in my Patent No. 2,180,287, the clutch element 22a is provided with a circumferential surface 43 (see Fig. 6) adapted to be engaged by a pair of semi-circular brake bands 41, 42 which are constantly urged into frictional, braking relationship with said surface 43. This constant urging is due to coiled springs 54, 55 which exert pressure on the shoes 41, 42, to produce the braking action, as more fully described in my prior patent.

The cover section 120 of the unit 20 is so formed as to constitute an integral housing and supporting means for the differential motor 26 and the gear train 53—57, there being a smaller cover plate 123 to complete the encasement of the latter, and a second closure plate 124 (Fig. 6) to encase the electrical connections which enter the unit by way of conduit terminal 125. Near its center the cover 120 is raised to provide a dome portion 121 which allows for the full stroke of plunger 52. The cover 120 also carries the depending brake anchoring posts 67 and 68 (Fig. 6) as in my prior patent.

What is claimed is:

In a valve control mechanism for the hydraulically shifted propeller blades of a multi-engined aircraft power plant, a shiftable plunger, a pair of nested springs bearing upon one end of said plunger, manually controlled power means including an electric motor and a motor-driven gear rotatable about the common axis of said nested springs for varying the loading of one of said springs, and engine-driven synchronous electrical means including a second electric motor for varying the loading of the other of said springs, to produce a plunger setting which will correspond to a condition of synchronism of the engines which drive said synchronous electrical means, and a single housing to enclose and support both said electric motors; one of said motors being supported in the cover portion of said housing.

RAYMOND T. ZWACK.